United States Patent [19]

Mueller-Mall et al.

[11] Patent Number: 4,794,151
[45] Date of Patent: Dec. 27, 1988

[54] PREPARATION OF FINELY DIVIDED HOMOPOLYMERS AND COPOLYMERS OF ETHENE USING A LIQUID ALKANE AS REACTION MEDIUM

[75] Inventors: Rudolf Mueller-Mall, Neuhofen; Guido Funk; Robert Bachl, both of Worms; Peter Hennenberger, Freinsheim; Erich Kolk, Bad Duerkheim, all of Fed. Rep. of Germany

[73] Assignee: BASF Aktiengesellschaft, Ludwigshafen, Fed. Rep. of Germany

[21] Appl. No.: 35,919

[22] Filed: Apr. 8, 1987

[30] Foreign Application Priority Data

Apr. 12, 1986 [DE] Fed. Rep. of Germany ....... 3612376

[51] Int. Cl.$^4$ .................... C08F 2/14; C08F 10/02; C08F 10/08
[52] U.S. Cl. ........................................ 526/64; 526/79; 526/88; 526/89; 526/144; 526/348.6; 526/352; 526/352.2; 526/909; 526/922
[58] Field of Search ............. 526/64, 79, 88, 89, 526/922, 348.2, 348.6, 352, 144, 909

[56] References Cited

U.S. PATENT DOCUMENTS

| | | | |
|---|---|---|---|
| 3,242,150 | 3/1966 | Scoggin | 526/64 X |
| 3,248,179 | 4/1966 | Norwood | 526/88 X |
| 3,293,000 | 12/1966 | Marwil | 526/64 X |
| 4,007,321 | 2/1977 | Scholz et al. | 526/64 X |
| 4,395,523 | 7/1983 | Kirch | 526/64 |

FOREIGN PATENT DOCUMENTS

| | | | |
|---|---|---|---|
| 0117492 | 9/1984 | European Pat. Off. | 526/64 |
| 841263 | 7/1960 | United Kingdom | 526/64 |
| 1435965 | 5/1976 | United Kingdom | 526/64 |

Primary Examiner—Joseph L. Schofer
Assistant Examiner—F. M. Teskin
Attorney, Agent, or Firm—Keil & Weinkauf

[57] ABSTRACT

A process for the continuous preparation of finely divided homopolymers and copolymers of ethene by catalytic polymerization in a circular tube reactor using a liquid alkane as reaction medium in which the ethene or ethene/comonomer mixture to be polymerized is present in dissolved form and the polymer formed is present in suspended form and running the reaction mixture as a cycle stream to which the feed materials are added by bleeding in and from which the polymer formed is withdrawn by bleeding out reaction mixture, comprising (a) maintaining the mean concentration $C_m$ of polymer in the cycle stream at a value within a certain range and (b) effecting the bleeding out of reaction mixture at a point of the cycle stream at which the concentration of polymer has a value which is lower than the mean concentration $C_m$ by a distinct and definite amount.

1 Claim, No Drawings

PREPARATION OF FINELY DIVIDED HOMOPOLYMERS AND COPOLYMERS OF ETHENE USING A LIQUID ALKANE AS REACTION MEDIUM

The present invention relates to a process for the continuous preparation of a finely divided homopolymer of ethene or copolymer of ethene with a minor amount of $C_3$–$C_8$-α-monoolefin, with an average particle diameter (by DIN 53,477) of from 0.3 to 1.5, in particular of from 0.5 to 1.2, mm and a bulk density (by DIN 53,468) of from 0.400 to 0.600, in particular from 0.450 to 0.550, g/cm$^3$ by catalytic polymerization at from 60° to 100° C., in particular from 70° to 90° C., and under a total pressure of from 30 to 50, in particular from 35 to 45, bar in a circular tube reactor using a $C_4$–$C_8$-alkane, in particular a $C_4$–$C_6$-alkane, which is present in liquid form as reaction medium in which the ethene or ethene/comonomer mixture to be polymerized is present in dissolved form and the polymer formed is present in suspended form, and running the reaction mixture as a cycle stream to which the feed materials are added by bleeding in and from which the polymer formed is withdrawn by bleeding out reaction mixture.

Polymerization processes of the type in question, ie. processes for preparing homopolymers and copolymers of ethene by suspension polymerization of the monomer(s) in a liquid alkane, are known in many forms; in the given context see for illustration in particular the procedures described in British Patents Nos. 841,263 and 1,435,965, U.S. Pat. Nos. 3,242,150 and 4,007,321 or European Laid-Open Application No. 0,117,492.

It is also known that with this type of continuous suspension polymerization there exists the highly disadvantageous tendency for fouling by polymer deposits to occur relatively rapidly on the surfaces of polymerization apparatus which come into contact with the reaction mixture. This tendency is particularly pronounced when finely divided polymers having extremely high bulk densities, ie. bulk densities (by DIN 53,468) of from 0.400 to 0.600, in particular from 0.450 to 0.550, g/cm$^3$, are to be produced. It is true that fouling can be reduced or suppressed by performing the polymerization in the presence of specific antistats as antifouling agents, but in return it is then necessary to accept that these agents are included in the polymer and have an adverse effect on the application properties thereof.

It is an object of the present invention to provide a process of the type defined at the beginning with which it is possible, even without using antifouling agents, to produce finely divided polymers of extremely high bulk densities, and otherwise good morphological properties, with substantially reduced or no fouling.

We have found that this object is achieved by (a) maintaining the mean concentration $C_m$ of polymer in the cycle stream at a value within a certain range and (b) effecting the bleeding out of reaction mixture at a point of the cycle stream where the concentration of polymer is lower than the mean concentration $C_m$ by a distinct and defined amount.

We have also found that the stated object is achieved in a particularly successful way by, in addition, performing the polymerization using a specific Ziegler catalyst system.

The present invention accordingly provides a process for the continuous preparation of a finely divided homopolymer of ethene or copolymer of ethene with a minor amount of $C_3$–$C_8$-α-monoolefin, with an average particle diameter (by DIN 53,477) of from 0.3 to 1.5, in particular of from 0.5 to 1.2, mm and a bulk density (by DIN 53,468) of from 0.400 to 0.600, in particular from 0.450 to 0.550, g/cm$^3$ by catalytic polymerization at from 60° to 100° C., in particular from 70° to 90° C., and under a total pressure of from 30 to 50, in particular from 35 to 45, bar in a circular tube reactor using a $C_4$–$C_8$-alkane, in particular a $C_4$–$C_6$-alkane, which is present in liquid form as reaction medium in which the ethene or ethene/comonomer mixture to be polymerized is present in dissolved form and the polymer formed is present in suspended form, and running the reaction mixture as a cycle stream to which the feed materials are added by bleeding in and from which the polymer formed is withdrawn by bleeding out reaction mixture.

The process according to the invention comprises
(a) maintaining the mean concentration $C_m$ of polymer in the cycle stream at a value within the range from 0.40 to 0.70, in particular from 0.50 to 0.60, g of polymer per g of reaction mixture and
(b) effecting the bleeding out of reaction mixture at a point of the cycle stream where the concentration of polymer has a value within the range from $0.50 \times C_m$ to $0.70 \times C_m$, in particular from $0.55 \times C_m$ to $0.65 \times C_m$.

In a preferred embodiment, the process according to the invention additionally comprises effecting the catalytic polymerization by means of a Ziegler catalyst system composed of
(1) a transition metal catalyst component,
(2) an organoaluminum catalyst component of the formula

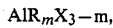

where
X is OR, chlorine, bromine or hydrogen, preferably OR or chlorine,
R is $C_1$–$C_{18}$-hydrocarbyl, in particular $C_1$–$C_{12}$-alkyl and preferably $C_2$–$C_8$-alkyl, and
m is a number from 1 to 3, preferably a number from 2 to 3, and
(3) an organohalogen catalyst component (=cocatalyst),
with the provisos that the atomic ratio of transition metal of catalyst component (1):aluminum of catalyst component (2) ranges from 1:0.1 to 1:500, preferably from 1:0.2 to 1:50, and the molar ratio of organoaluminum catalyst component (2):organohalogen catalyst component (3) ranges from 1:0.001 to 1:20, preferably from 1:0.01 to 1:5, and subject to the special provision
(1) the transition metal catalyst component used is the solid phase product (VI) obtained by
(1.1) first of all bringing into contact with one another
(1.1.1) a finely divided porous inorganic oxidic substance (I) which possesses a particle diameter of from 1 to 1,000 μm, preferably from 1 to 400 μm, a pore volume of from 0.3 to 3 cm$^3$/g, preferably from 1 to 2.5 cm$^3$/g, and a surface area of from 100 to 1,000 m$^2$/g, preferably from 200 to 400 m$^2$/g, and has the formula $SiO_2 \cdot aAl_2O_3$, where a is a number within the range from 0 to 2, in particular from 0 to 0.5, and
(1.1.2) a solution (II) as is obtained on bringing together
(IIa) 100 parts by weight of a saturated aliphatic or partly saturated aliphatic, partly aromatic oxahydrocarbon of 1 or 2 oxa oxygen atoms and more than 3 but fewer than 19 carbon atoms, preferably a saturated aliphatic or partly saturated aliphatic, partly aromatic oxahydrocarbon of 1 oxa oxygen atom and more than 3, but fewer than 11 carbon atoms, in particular a cyclic saturated aliphatic oxahydrocarbon of 1 oxa oxygen atom and 4 to 6 carbon atoms, especially tetrahydrofuran, and (IIb) from 0.01 to 50, preferably from 1 to 30, parts by weight of a mixture of (IIb1) 100 mole parts of a vanadium trihalide/alcohol complex of the formula $VY_3.nZ—OH$, where Y is chlorine or bromine, preferably chlorine, n is a number from 1 to 6, preferably from 3 to 4, and Z is monovalent saturated aliphatic or partly saturated aliphatic, partly aromatic hydrocarbyl of not more than 10, preferably not more than 8, carbon atoms, in particular alkyl of not more than 6 carbon atoms, (IIb2) from 0.2 to 300, preferably from 0.5 to 100, mole parts of a titanium trihalide, where the halogen can be chlorine and/or bromine, preferably of titanium trichloride or of a titanium trihalide/alcohol complex of the formula $TiY_3.nZ—OH$, where Y is chlorine or bromine, preferably chlorine, n is a number from 1 to 6, preferably from 3 to 4, and Z is monovalent saturated aliphatic or partly saturated aliphatic, partly aromatic hydrocarbyl of not more than 10, preferably not more than 8, carbon atoms, in particular alkyl of not more than 4 carbon atoms, and (IIb3) - optionally and advantageously—from 1 to 400, preferably from 3 to 200, mole parts of a zirconium tetrahalide, where the halogen can be chlorine and/or bromine, preferably of zirconium tetrachloride, to form a suspension (III), with the proviso that the weight ratio of inorganic oxidic substance (I):transition metal composition (IIb) ranges from 1:0.01 to 1:2, preferably from 1:0.2 to 1:1.5, evaporating the suspension (III) at a temperature which is below 200° C., preferably below 160° C., and above the melting point of the oxahydrocarbon (IIa) used, to dryness to form a solid phase intermediate (IV), and (1.2) then bringing into contact with one another (1.2.1) the solid phase intermediate (IV) obtained from stage (1.1) and (1.2.2) dissolved in an organic solvent, an aluminum compound (V) of the formula $AlR_mX_{3-m}$, where X is OR, chlorine, bromine or hydrogen, preferably OR or chlorine, R is $C_1$-$C_{18}$-hydrocarbyl, in particular $C_1$-$C_{12}$-alkyl, and preferably $C_2$-$C_8$-alkyl, and m is a number from 1 to 3, preferably 2, to form a suspension, with the proviso that the weight ratio of solid phase intermediate (IV): aluminum compound (V) ranges from 1:0.05 to 1:2, preferably from 1:0.1 to 1:1, the solid phase product (VI) which is the resulting suspended matter being the transition metal catalyst component (1).

This Ziegler catalyst system as such and its particular transition metal catalyst component (1) as such do not form part of the subject-matter of the present invention; they are known from and described in detail in European-Laid-Open Application No. 0,166,888 (=U.S. Pat. No. 4,710,552), making further explanation of the system and of its particular catalyst component (1) unnecessary here.

The following remarks are directed to technical aspects of the novel process:

This novel process falls within the general category of processes for the continuous preparation of finely divided homopolymers of ethene or copolymers of ethene with minor amounts of α-monoolefins by catalytic polymerization in a liquid alkane as reaction medium containing the monomer or monomer mixture to be polymerized in dissolved form and the particulate polymer formed in suspended form under elevated temperature and pressure conditions by running the reaction mixture as a cycle stream to which the starting materials are added by bleeding in and from which the particulate product formed is withdrawn by bleeding out reaction mixture and wherein the catalytic polymerization is preferably effected by means of a specifically chosen Ziegler catalyst system.

In this respect, ie. as regards the general category in which it belongs, the process according to the invention has no special features and can be carried out in a conventional manner (cf. for example the patent publications cited at the beginning), thereby making more detailed explanations thereof superfluous.

Against that, the process according to the invention is novel in (a) maintaining the mean concentration $C_m$ of polymer in the cycle stream at a value within the range from 0.40 to 0.70, in particular from 0.50 to 0.60, g of polymer per g of reaction mixture and (b) effecting the bleeding out of the reaction mixture at a point of the cycle stream where the concentration of polymer has a value within the range from $0.50 \times C_m$ to $0.70 \times C_m$, in particular $0.55 \times C_m$ to $0.65 \times C_m$.

This novel teaching follows on from the surprising finding, obtained from a series of measurements, that in the type of polymerization processes in question the local concentration of polymer in a cycle stream under continuous steady-state conditions varies appreciably, not with time, but from place to place.

If the conventional type of circular tube reactor is employed, a suitable site for the bleeding out of reaction mixture under the conditions of the invention will in general be found in the bottommost section of the circular tube on the uppermost inner surface there of, as can easily be checked or ascertained in a simple measurement.

EXAMPLE (A) Copolymerization of ethene and but-1-ene

Effected continuously in a conventional loop reactor of the type described in U.S. Pat. No. 3,242,150; the circular tube of the reactor had an inside circumference of 11.4 m and an inside diameter of 0.15 m.

In detail, the following conditions were employed under continuous steady-state operation:

(a) The reaction medium used was isobutane.
(b) The amount of monomeric ethene in the reaction mixture was maintained at a constant 25% by volume.
(c) The amount of monomeric but-1-ene in the reaction mixture was maintained at a constant 4% by volume.
(d) The amount of hydrogen in the reaction mixture was maintained at a constant 0.15% by volume.
(e) The Ziegler catalyst system used was described in European Laid-Open Application 0,166,888 (=U.S. Pat. No. 4,710,552) and comprised
(1) a transition metal catalyst component as described at the end of this Example,
(2) triisobutylaluminum and
(3) trichloromonofluoromethane, with the provisos that the atomic ratio of transition metal of catalyst component (1): aluminum of catalyst component (2) was a constant 1:5.63 and the molar ratio of catalyst component (2):catalyst component (3) was a constant 1:0.11.

The reference standard for the absolute amounts of these catalyst components was the concentration of triisobutylaluminum in the reaction mixture, which was maintained at a constant 135 mg/kg of isobutane.

(f) Copolymerization was effected at 80° C., corresponding to a total pressure of the reaction mixture of about 40 bar.

(g) The reaction mixture was run as a cycle stream with a speed of 8 m/s.

(h) The mean concentration $C_m$ of polymer in the cycle stream was maintained at a constant 0.54 g of polymer per g of reaction mixture. The polymer formed was withdrawn from the reactor by bleeding out reaction mixture in the middle of the bottommost section of the circular tube on the uppermost inner surface thereof, where the concentration of polymer had a value of $0.59 \times C_m$, corresponding to 0.32 g of polymer per g of reaction mixture.

In this way 19.5 kg of copolymer were obtained per hour; said copolymer had a melt flow index (at 190°/21.6 kg by DIN 53,735) of 165 g/10', a density (by DIN 53,479) of 0.949 g/cm³, an average particle diameter (by DIN 53,477) of 0.95 mm and a bulk density (by DIN 53,468) of 495 g/cm³.

Even on operation for many weeks the reactor walls were free of fouling by polymer deposit.

(B) Preparation of the transition metal catalyst component (1) used in the above polymerization Stage (1.1)

The starting materials used were 25 parts by weight of silicone dioxide ($SiO_2$, particle diameter: 20–60 μm, pore volume: 1.75 cm³/g, surface area: 340 m²/g) and a solution of 100 parts by weight of tetrahydrofuran and 12.5 parts by weight of a transition metal composition composed of 100 mole parts of a vanadium trihalide/alcohol complex of the formula $VCl_3 \cdot 4\ ZOH$, where Z is isopropyl, 1.3 mole parts of a titanium trihalide of the formula $TiCl_3 \cdot 1/3\ AlCl_3$ and 6.7 mole parts of zirconium tetrachloride. These two components were combined, and the resulting suspension was briefly stirred. Thereafter the solid phase intermediate which had formed was isolated by driving off the volatile constituents in a rotary evaporator brought to an operating pressure of 10 mbar and an operating temperature of 70° C.

Stage (1.2)

20 parts by weight of the solid phase intermediate obtained in stage (1.1) were suspended in 100 parts by weight of n-heptane, to this suspension was added a solution of 8 parts by weight of diethylaluminum chloride in 20 parts by weight of n-heptane, and the resulting suspension was briefly stirred at 65° C. This was followed by filtration, three washes with n-heptane and drying under reduced pressure. Analysis of the solid phase product obtained, ie. catalyst component (1), revealed a transition metal content of 0.00156 mol/g.

The English translation of the pertinent sections of DIN 53477 and DIN 53468 is as follows:
DIN 53477—Determination of Particle Size and Size Distribution of Powdered Thermosetting Molding Materials by Sieve Analysis
4. Testing Equipment
4.1 Testing Sieves, Lids and Bottom Plates The sieves (testing sieves) are round; their sieve areas have a diameter of 200 mm. The sieve walls and the sieve netting consist of metal. Lids, all sieve drums and bottom plates, in a tightly closing way, fit on or into one another. They are strung with testing sieve netting according to DIN 4188. In most cases, a sieve set with testing sieve nettings according to Table 1 is sufficient.

TABLE 1

| Conventional Testing Sieve Nettings | | |
|---|---|---|
| Testing Sieve Nettings according to DIN 4188 | Mesh Width mm | Diameter of wire mm |
| 2 | 2 | 1 |
| 1 | 1 | 0,63 |
| 0,5 | 0,5 | 0,315 |
| 0,25 | 0,25 | 0,16 |
| 0,125 | 0,125 | 0,063 |
| 0,063 | 0,063 | 0,04 |

If required, testing sieves with a netting with larger mesh widths may be added, in which case the geometrical series must be maintained.

4.2 Rubber Cubes

Cubes made of rubber of an edge length of 18 mm; hardness (70+3) shore of DIN 53505; apparent density 1.6 to 1.7 g/cm³. The corners and edges of the cube must be rounded in such a way that surfaces having a diameter of 15 mm are created as the sides of the cubes.

4.3 Sifting Machine

By means of the correct selection of the sifting machine, it must be provided that a division into particle sizes that corresponds to the particle mixture of the molding materials will be finished after 10 minutes. The division is achieved by a circular vibration of the sieve set in a plane with a frequency of 300 min.$^{-1} \pm +$min.$^{-1}$ and an amplitude of 15 mm.

4.4 Chronometer

For the measuring of the length of the sifting, a microchronometer with a division of the dial into minutes or less is used.

4.5 Scale

A scale must be used that has a margin of error of ±0.1 g.

5. IMPLEMENTATION 5.1 If no other arrangements were made, the sample is tested without prior treatment (as furnished). If the sample is not tested on the day it was taken, it must be stored under closed-off, moisture-proof conditions.

5.2 The sieves listed in Paragraph 4.1, in the sequence of their mesh width (sieve with the larges mesh width on top), are placed on top of one another and then are placed on the bottom plate in a tightly closing way. Two rubber cubes according to Paragraph 4.2 respectively are placed on the lower three sieves.

5.3 100 g of molding material are weighed in to 0.1 g and are quantitatively placed on the uppermost sieve of the set of sieves. Then the sieve is closed tightly by means of the lid.

5.4 The set of sieves is mounted on the sifting machine and is grounded so that electrostatic charges are avoided. The set of sieves is vibrated for 10 minutes±15 seconds. After the vibrating, the individual sieves are carefully disconnected, and the quantities remaining on the sieves and on the bottom plate are weighed to 0.1 g. This takes place either by transferring the individual particle sizes (fractions—translator) to weighing receptacles (such as porcelain, plastic or metal bowls, weighing bottles, moisture-resistant paper pads or directly into the scales) that previously were also weighted to 0.1 g, or by weighing out the individual testing sieves and the bottom plate with the contents and subtracting the determined tare weights for the sieves and the bottom plate. In the former case, the molding material particles adhering to the walls and nettings of the sieves, before the weighing, by means of a soft brush, must be added completely to the amount of the pertaining particle size (fraction—translator).

6. ANALYSIS

The parts of the particle mixture remaining on the testing sieves and on the bottom in the test according to Paragraph 5, classified according to the particle sizes (fractions-translator) corresponding to Table 2, and as sieve residues in percent by weight relative to the originally weighed-in quantity according to Paragraph 5.3, when testing sieve nettings according to Table 1 are used, are calculated to 0.1 percent in weight. In the test report, the individual sieve residues must be indicated as size distribution.

If, as a result of loss of material, the total of the determined sieve residues is less than 100%, the following method is used: Losses $\leq 1$ percent in weight are added to the finest particle size. In the case of losses $> 1$ percent in weight, the tests must be repeated.

TABLE 2

| Particle Sizes | |
| --- | --- |
| Particle Mixture on the Testing Sieve Netting According to DIN 4188 | Particle Size |
| 2 | above 2 |
| 1 | above 1 to 2 |
| 0.5 | above 0.5 to 1 |
| 0.25 | above 0.25 to 0.5 |
| 0.125 | above 0.125 to 0.25 |
| 0.063 | above 0.063 to 0.125 |
| Bottom Plate | to 0.063 |

DIN 53468—Determination of Apparent Density of Molding Materials

3. Taking of Samples, Number and Pretreatment of Samples

Three average samples of approximately 150 ml respectively are taken, in the furnished condition, from the molding material to be tested. If no other arrangements are made, the samples are tested in the condition in which they were furnished.

4. Testing Equipment 4.1 Feeding funnel (for example, of metal) with a drop bottom (see illustration). The feeding funnel has a capacity of approximately 200 ml; it is fastened at a stand at an indicated height. Its interior wall is polished.

4.2 Cylindrical measuring cup of a capacity of 100 ml±0.5 ml according to the illustration, with polished interior walls.

4.3 Scale with a margin of error of ±0.1 g.

Measurements in mm

The design does not have to correspond to the illustration. Only the indicated measurements must be maintained. Accordingly, the illustration that appears in the original version of DIN 53468 has been omitted herein.

5 IMPLEMENTATION 5.1 A 110 to 120 ml sample is loosely filled into the feeding funnel. The measuring cup is weighed in to 0.1 g ($G_0$ in g) and is placed vertically under the feeding funnel.

5.2 Then the drop bottom of the feeding funnel is opened up so that the sample falls into the measuring cup. If required, the flowing of the sample can be aided by stirring with a rod.

5.3 The molding material that has piled up above the upper edge of the measuring cup is scraped off with a straightedge knife an an angle of 45° with respect to the accumlated molding material.

5.4 The measuring cup filled with the molding material is weighed to 0.1 ($G_1$ in g).

For each type of molding material, the apparent density is determined on three samples.

6. EVALUATION

The apparent density is calculated according to the following numerical equation:

$$\text{Apparent density} = \frac{G_1 - G_o}{100} \text{ in g/ml}$$

We claim:

1. A process for the continuous preparation of a finely divided homopolymer of ethene or copolymer of ethene with a minor amount of $C_3$-$C_8$-$\alpha$-monoolefin, with an average particle diameter (by DIN 53,477) of from 0.3 to 1.5 mm and a bulk density (by DIN 53,468) of from 0.400 to 0.600 g/cm$^3$ by catalytic polymerization at from 60° to 100° C. and under a total pressure of from 30 to 50 bar in a circular tube reactor using a $C_4$-$C_8$-alkane which is present in liquid form as reaction medium in which the ethene or ethene/comonomer mixture to be polymerized is present in dissolved form and the polymer formed is present in suspended form, and running the reaction mixture as a cycle stream to which the feed materials are added by bleeding in and from which the polymer formed is withdrawn by bleeding out reaction mixture, which comprises (a) maintaining the mean concentration $C_m$ of polymer in the cycle stream at a value within the range from 0.40 to 0.70 g of polymer per g of reaction mixture and (b) effecting the bleeding out of reaction mixture at a point of the cycle stream where the concentration of polymer has a value within the range from $0.50 \times C_m$ to $0.70 \times C_m$.

* * * * *